(12) United States Patent
Schoepe et al.

(10) Patent No.: US 9,702,776 B2
(45) Date of Patent: Jul. 11, 2017

(54) SENSOR DEVICE FOR A MOTOR VEHICLE, MOTOR VEHICLE AND METHOD FOR PRODUCING A SENSOR DEVICE

(71) Applicant: VALEO Schalter und Sensoren GmbH, Bietigheim-Bissingen (DE)

(72) Inventors: Roman Schoepe, Maulbronn (DE); Dirk Rachui, Bietigheim-Bissingen (DE); Ekkehart Froehlich, Nordheim (DE); Jens Thom, Boeblingen (DE)

(73) Assignee: VALEO Schalter und Sensoren GmbH, Bietigheim-Bissingen (DE)

( * ) Notice: Subject to any disclaimer, the term of this patent is extended or adjusted under 35 U.S.C. 154(b) by 7 days.

(21) Appl. No.: 14/437,658

(22) PCT Filed: Sep. 12, 2013

(86) PCT No.: PCT/EP2013/068901
§ 371 (c)(1),
(2) Date: Apr. 22, 2015

(87) PCT Pub. No.: WO2014/063864
PCT Pub. Date: May 1, 2014

(65) Prior Publication Data
US 2015/0276524 A1 Oct. 1, 2015

(30) Foreign Application Priority Data

Oct. 27, 2012 (DE) .......................... 10 2012 021 137

(51) Int. Cl.
*G01L 5/22* (2006.01)
*G01L 3/10* (2006.01)
(Continued)

(52) U.S. Cl.
CPC ................ *G01L 5/22* (2013.01); *B29C 65/08* (2013.01); *G01L 3/104* (2013.01); *G01L 5/221* (2013.01);
(Continued)

(58) Field of Classification Search
CPC ....................................... G01L 3/104
See application file for complete search history.

(56) References Cited

U.S. PATENT DOCUMENTS

| 4,716,648 A * | 1/1988 | Nel .......................... H02K 1/185 |
| | | 29/596 |
| 6,367,337 B1 * | 4/2002 | Schlabach ................. B62D 6/10 |
| | | 180/443 |

(Continued)

FOREIGN PATENT DOCUMENTS

| DE | 102 40 049 A1 | 4/2003 |
| DE | 10 2007 043 502 A1 | 4/2009 |

(Continued)

OTHER PUBLICATIONS

International Search Report for corresponding International Application No. PCT/EP2013/068901, mailed Apr. 7, 2014 (2 pages).

*Primary Examiner* — Lisa Caputo
*Assistant Examiner* — Tran M Tran
(74) *Attorney, Agent, or Firm* — Osha Liang LLP

(57) ABSTRACT

A sensor device for measuring a measurement variable characterizing a rotation state of a shaft portion of a motor vehicle, in particular a steering axle of the motor vehicle, is disclosed. The sensor device includes a holder which can be connected to the shaft portion of the motor vehicle, a magnetic stator portion which is arranged on the holder and which is constructed for conducting magnetic flux from a magnet towards a magnetic sensor and which has an annular radial base element, which is axially supported with the axial front side thereof on the holder, and a fixing element for
(Continued)

fixing the stator portion at least in an axial direction to the holder from the axial rear side thereof which is opposite the front side, wherein the holder has at least one welding rib, via which the holder is connected to the fixing element by friction welding.

9 Claims, 2 Drawing Sheets

(51) Int. Cl.
    *B29C 65/08*     (2006.01)
    *B29K 101/12*     (2006.01)
    *B29L 31/00*     (2006.01)

(52) U.S. Cl.
    CPC ..... *B29K 2101/12* (2013.01); *B29L 2031/752* (2013.01)

(56) References Cited

U.S. PATENT DOCUMENTS

| | | | | |
|---|---|---|---|---|
| 6,912,923 | B2 * | 7/2005 | Froehlich | G01L 3/104 73/862.331 |
| 7,406,884 | B2 * | 8/2008 | Jerems | G01L 5/221 73/862.331 |
| 8,375,810 | B2 * | 2/2013 | Bae | G01L 3/10 73/862.334 |
| 8,390,276 | B2 * | 3/2013 | McDonald | G01D 5/145 324/174 |
| 8,393,230 | B2 * | 3/2013 | Jeon | B62D 6/10 73/862.193 |
| 8,397,588 | B2 * | 3/2013 | Kang | G01B 7/30 73/862.08 |
| 8,448,528 | B2 * | 5/2013 | McDonald | B62D 6/10 73/862.331 |
| 8,561,481 | B2 * | 10/2013 | Bae | G01L 3/104 73/862.334 |
| 8,776,619 | B2 * | 7/2014 | Jammer | G01L 3/102 73/862.333 |
| 8,939,038 | B2 * | 1/2015 | Woo | G01L 3/104 73/862.331 |
| 8,943,879 | B2 * | 2/2015 | Kang | B62D 6/10 73/117.02 |
| 8,955,396 | B2 * | 2/2015 | Bae | G01L 3/10 73/862.334 |
| 9,255,854 | B2 * | 2/2016 | Kim | F16B 21/16 |
| 9,434,410 | B2 * | 9/2016 | Lee | B62D 6/10 |
| 9,464,954 | B2 * | 10/2016 | Kim | F16B 21/16 |
| 9,505,431 | B2 * | 11/2016 | Yoshida | B62D 6/10 |
| 2004/0194560 | A1 | 10/2004 | Froehlich et al. | |
| 2011/0005340 | A1 * | 1/2011 | Jeon | B62D 6/10 73/862.193 |
| 2016/0146634 | A1 * | 5/2016 | Elpermann | B60R 16/027 324/207.15 |
| 2016/0214648 | A1 * | 7/2016 | Schoepe | B62D 15/0215 |

FOREIGN PATENT DOCUMENTS

DE      10 2007 050 258 A1      4/2009
WO      2009/035266 A2      3/2009

\* cited by examiner

SENSOR DEVICE FOR A MOTOR VEHICLE, MOTOR VEHICLE AND METHOD FOR PRODUCING A SENSOR DEVICE

The invention relates to a sensor device for measuring a measurement variable, in particular a torque, characterizing a rotation state of a shaft portion of a motor vehicle, in particular a steering axle of the motor vehicle. The sensor device comprises a holder which can be connected to the shaft portion of the motor vehicle and a magnetic stator portion which is arranged on the holder and which is constructed for conducting magnetic flux from a magnet towards a magnetic sensor and which has an annular radial base element, which is axially supported with the axial front side thereof on the holder. The sensor device also comprises a fixing element, by means of which the stator portion is fixed at least in an axial direction to the holder from the axial rear side thereof which is opposite the front side. The invention further relates to a motor vehicle having such a sensor device and a method for producing such a sensor device.

In this instance, the interesting aspect particularly involves a torque sensor device which is constructed to detect a torque which is applied to a steering axle of a motor vehicle. Such torque sensor devices are already prior art and can be used, for example, in electrical steering systems. Such a sensor device is known, for example, from the document US 2004/0194560 A1 and from the publication DE 102 40 049 A1. The torque sensor device is fitted to two shaft portions or part-shafts of the steering axle which are opposite each other in an axial direction and which are connected to each other via a torsion rod. A magnet, for example, a ring magnet, is arranged on the first shaft portion while a holder having a magnetic stator, which is opposite the permanent magnet in a radial direction via a small air gap, is fitted to the other shaft portion. The magnetic flux of the magnet is conducted via the stator, which generally comprises two separate and identical stator portions, towards a first and a second flux conductor which then discharge the magnetic flux to a magnetic sensor, for example, a Hall sensor. The magnetic sensor is located between the two flux conductors. Such a torque sensor device is further known from the document DE 10 2007 043 502 A1.

The two stator portions are fixed to the holder and fitted in a rotationally secure manner. The two stator portions typically have an annular planar base element which is radial or extends in a radial direction and which is directed radially outwards, and from which a large number of tooth elements which are arranged so as to be distributed in a peripheral direction project in an axial direction. Those tooth elements are therefore directed in an axial direction. Whereas the tooth elements serve to receive the magnetic flux in a radial direction from the permanent magnet, the annular radial base element serves to discharge the magnetic flux axially to the flux conductor and thereby to the magnetic sensor. The holder having the stator including the two stator portions is securely fitted to a first shaft portion of the steering axle and the permanent magnet is fitted to a second shaft portion of the steering axle, which second portion is connected to the first shaft portion via the torsion rod. A torque which is applied to the shaft then twists the torsion rod slightly and consequently results in a small relative rotation between the stator and the permanent magnet.

In the document WO 2009/035266 A2, a large number of recesses in the form of through-holes are formed in the magnetic stator portion. Corresponding studs or bolts of the holder are then received in those recesses in order to fix the magnetic stator portion to the holder.

Another method of fixing the stator portion to the holder, as known from the prior art, provides for the stator portion to be fixed to the holder in an axial direction from the axial rear side thereof by means of an additional fixing element by that fixing element being joined to the holder. The stator portion is fitted to the holder and supported on a stop element of the holder with the axial front side thereof. From the axial rear side of the stator portion, the fixing element in the form of a ring is then fitted on the holder and welded to the holder by laser. However, the laser welding process has been found to be very demanding and complex in technological terms. This is because expensive laser welding systems are required. Furthermore, the diameter of the annular fixing element has to be adapted very precisely to the outer diameter of the holder so that the annular fixing element is fitted to the holder with a simple press-fit action in a radial direction. In this instance, the fixing element is typically fitted on studs of the holder which are arranged so as to be distributed in a peripheral direction. Not least, the process control of the laser welding operation is very complex.

An object of the invention is to provide a solution as to how, in a sensor device of the type mentioned in the introduction, a simple and reliable fixing of the magnetic stator portion to the holder can be made possible.

This object is achieved according to the invention by a sensor device, by a motor vehicle and by a method having the features according to the independent patent claims, respectively. Advantageous constructions of the invention are set out in the dependent patent claims, the description and the Figures.

A sensor device according to the invention is constructed for measuring a variable characterizing a rotation state of a shaft portion of a motor vehicle, in particular a rotation state of a shaft portion of a steering axle. That measurement variable is preferably a torque. The sensor device has a holder which can be connected to the shaft portion. The sensor device also has a magnetic stator portion which is constructed for conducting magnetic flux from a magnet towards a magnetic sensor (in particular via a flux conductor) and which has an annular radial base element, which is axially supported with the axial front side thereof on the holder. The sensor device further also comprises a fixing element, by means of which the stator portion is fixed at least in an axial direction to the holder from the axial rear side thereof which is opposite the front side. The stator portion can in particular be constructed from a soft-magnetic material. The holder has at least one welding rib, via which the holder is connected or joined to the fixing element by friction welding.

Consequently, it is proposed according to the invention to construct the holder so as to have a welding rib or an extension member, via which a welding connection can be produced with respect to the fixing element by friction welding. As a result of the welding rib, consequently, friction welding, in particular ultrasound welding, is possible and is a substantially less demanding welding process than laser welding. As a result of the friction welding, consequently, the connection process of the holder with respect to the fixing element is generally simplified, and consequently the fixing process of the magnetic stator portion with respect to the holder. The friction welding can firstly be brought about in a substantially cheaper manner than laser welding because the systems required are more cost-effective than laser welding systems. Furthermore, friction welding also affords the advantage that the sonotrode which is used, for example, in ultrasound welding, does not come into contact with the magnetic stator portion and consequently deformation of the stator portion is impossible in principle. Another advantage involves the robustness of the welding process because a friction welding system, such as in particular an ultrasound welding system, can be controlled directly in a force/path controlled manner. Furthermore, the force is applied uniformly to the stator portion during friction welding so that no deformation of the stator portion is produced. The fixing by means of friction welding is further play-free. Not least, the diameter tolerance of the fixing element (if this is constructed in an annular manner) is non-critical.

The holder can be connected to the fixing element by ultrasound welding via the at least one welding rib. At least the fixing element is preferably formed from a thermoplastic plastics material. The heat required to join the holder to the fixing element is achieved during ultrasound welding by a high-frequency mechanical oscillation which is produced by means of a corresponding generator, an ultrasound converter and the so-called sonotrode, and transmitted to the joining counter-member. The sonotrode may be constructed in the form of a cylinder in a particularly robust manner. By the holder being joined to the fixing element by means of ultrasound welding, the advantages of the invention are completely brought to bear.

The welding rib preferably forms an extension member which is axial or which is directed in an axial direction and via which the holder is axially connected to the fixing element. The joining process by means of friction welding is consequently carried out in an axial direction. Forces applied to the fixing element during friction welding can consequently be distributed uniformly over the entire periphery so that a deformation of the stator portion can be prevented. As a result of the axial connection, a particularly secure arrangement of the stator portion is further ensured in an axial direction.

It is found to be advantageous if the fixing element adjoins the rear side of the base element of the stator portion. Consequently, the base element of the stator portion, on the one hand, adjoins the holder and, on the other hand, axially adjoins the fixing element and is consequently retained on the holder in a particularly slip-resistant manner. The welding process is preferably carried out in an axial direction until the fixing element is brought into abutment with the rear side of the base element of the magnetic stator portion.

The fixing element is preferably constructed in an annular manner, in particular in an annular manner extending in a completely peripheral manner. The fixing element can also be arranged concentrically with respect to the holder. Consequently, the fixing forces are distributed over the entire periphery of the stator portion so that, on the one hand, a particularly effective fixing action of the stator portion is ensured with respect to the holder and, on the other hand, a mechanical stress and where applicable a deformation of the stator portion are also prevented.

In one embodiment, the holder has a large number of welding ribs which are arranged so as to be distributed in a peripheral direction or which are arranged with spacing from each other, and which are directed in particular in an axial direction and via which the holder is connected to the fixing element by friction welding. Consequently, the welding connection is provided at various locations along the periphery, which increases the reliability of the fixing action. Such a large number of welding ribs which are arranged so as to be distributed in a peripheral direction, in particular in an equidistant manner, also has the technical advantage in production terms that all the welding locations can be joined simultaneously and consequently the friction welding is carried out in a single process step or during a very short cycle time. It is simply necessary for the, in particular annular, fixing element to be arranged on the welding ribs, and the welding process can be carried out within a short cycle time with uniform force distribution so that all the welding ribs are joined at the same time in the fixing element which melts during this process.

Alternatively, however, there may also be provision for the holder to have a single welding rib, which is directed in particular in an axial direction, which is constructed so as to be completely peripheral and which is consequently annular, and via which the holder is axially connected to the annular fixing element by friction welding.

In one embodiment, there is provision for the holder to have a groove-like collection channel which extends at least partially round at least one welding rib for a molten mass of the fixing element, which molten mass is produced during friction welding. This is because, during welding, the fixing element—in particular only the fixing element—becomes molten. That molten mass can now be collected in the groove-like collection channel so that the formation of adhering portions as a result of hardened molten mass can be prevented. Such adhering portions could result in a change to the geometric shape of the holder and consequently where applicable an impairment of the operation of the sensor device.

The holder has in particular a cylindrical first axial region, on which the base element is axially supported with the front side. A cylindrical second axial region, which is arranged concentrically relative to the first region, which has a smaller diameter and which is connected to the first axial region, in particular in an integral manner, via a large number of connection elements which are arranged so as to be distributed in a peripheral direction, adjoins the first axial region preferably in a direct manner. The connection elements may be angular elements which have a radial region and an axial region. The axial region is then directly connected to the first axial region of the holder, while the radial region of an individual connection element is directly connected to the second axial region of the holder. Such a large number of connection elements result in radial recesses or through-openings, in which tooth elements of the stator portion can be received and through which those tooth elements can be introduced, being formed between those elements.

The stator portion is preferably fitted to the second axial region of the holder and the at least one welding rib is preferably constructed on one of the connection elements. The first axial region of the holder consequently forms a stop element, on which the axial front side of the stator portion is axially supported.

The stator portion may have a large number of tooth elements which are arranged so as to be distributed in a peripheral direction and which project in an axial direction from the radial base element, and which are constructed to receive the magnetic flux from the magnet. The tooth elements preferably extend axially into the first axial region of the holder, in particular in such a manner that the tooth elements adjoin an inner periphery of the first axial region. Consequently, a slip-resistant arrangement of the stator portion on the holder is also ensured in a radial direction.

The invention also relates to a motor vehicle, in particular a private motor vehicle, having a sensor device according to the invention.

A method according to the invention is used to produce a sensor device for a motor vehicle, by which device a measurement variable characterizing a rotation state of a shaft portion of the motor vehicle is measured. The production comprises the following steps: providing a holder which is connected to the shaft portion; providing a magnetic stator portion for conducting magnetic flux, the stator portion being constructed so as to have an annular radial base element which is axially supported on the holder with an axial front side; and providing a fixing element, by means of which the stator portion is fixed to the holder at least axially from the axial rear side thereof which is opposite the front side. The holder is connected to the fixing element by friction welding, in particular by ultrasound welding.

The preferred embodiments which are set out with reference to the sensor device according to the invention and the advantages thereof apply accordingly to the motor vehicle according to the invention and to the method according to the invention.

Other features of the invention will be appreciated from the claims, the Figures and the description of the Figures. All the features and feature combinations mentioned above in the description and the features and feature combinations which are mentioned below in the description of the Figures and/or which are only shown in the Figures may be used not only in the combination set out in each case but also in other combinations or alone.

The invention will now be explained in greater detail with reference to a preferred embodiment and with reference to the appended drawings, in which.

Figure 1:
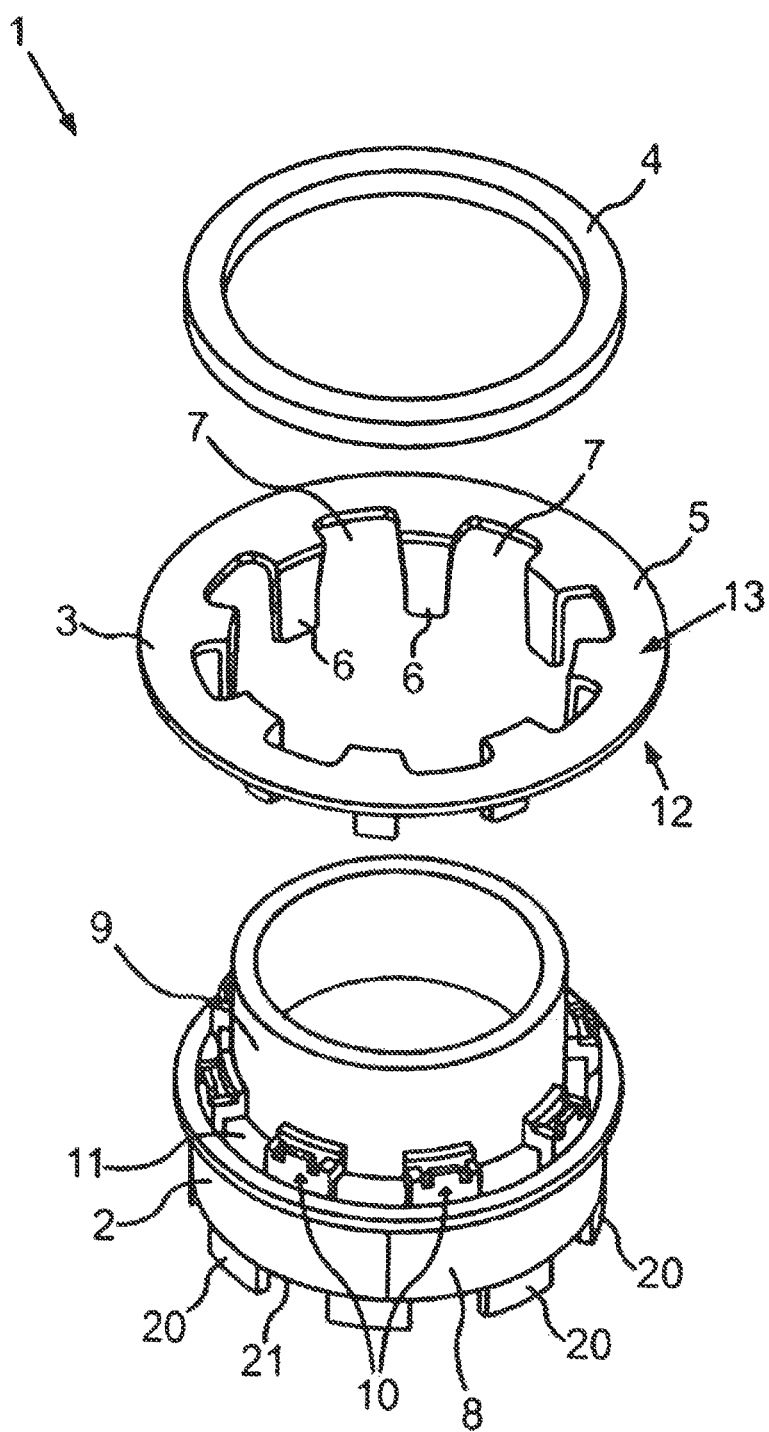
FIG. 1 is an exploded schematic, perspective view of part-components of a sensor device according to an embodiment of the invention.

The components of a sensor device 1 illustrated in FIG. 1 are a holder 2, a stator portion 3 and a fixing element 4. The sensor device 1 is used to measure a torque which is applied to a steering axle of a motor vehicle. The steering axle comprises two shaft portions which are connected to each other via a torsion rod. The holder 2 is connected to the first shaft portion in a rotationally secure manner and a permanent magnet is connected to the second shaft portion in a rotationally secure manner. The permanent magnet is then radially opposite the holder via a radial air gap. The permanent magnet is therefore then located inside the stator portion 3 and consequently with mutual radial overlap with respect to the stator portion 3. The sensor device 1 comprises a total of two such stator portions 3, which are identical components. The second stator portion is not illustrated in the Figures. However, it can also be secured to the holder 2 in the same manner as the stator portion 3 shown, but from the opposite side.

The sensor device 1 may also have at least one flux conductor which is not illustrated and which receives the magnetic flux from the stator portion 3 and transmits it to a magnetic sensor. The stator portion 3 can then be rotated relative to the flux conductor.

The sensor device 1 may also be combined where applicable with a steering axle sensor device which is used to measure the current steering angle of the steering axle.

The stator portion 3 is formed from a soft-magnetic material and has an annular radial base element 5, from the inner edge or rim of which a large number of tooth elements 6 project in an axial direction. The tooth elements 6 are arranged so as to be distributed in an equidistant manner in a peripheral direction so that the respective angular spacings between two adjacent tooth elements 6 are of the same size. A radial formation 7 is formed in the base element 5 at the inner periphery of the base element 5 between two adjacent tooth elements 6, respectively. The stator portion 3 is generally constructed in an integral manner so that the tooth elements 6 are integrally connected to the base element 5.

The holder 2 is also generally constructed in an integral manner. It may, for example, be formed from plastics material. The holder 2 has a cylindrical first axial region 8 and a similarly cylindrical second axial region 9. The second axial region 9 has a smaller diameter than the first region 8, both the inner diameter and the outer diameter of the second region 9 being smaller than the inner diameter and the outer diameter of the first region 8, respectively. The wall thicknesses of the axial regions 8, 9 are also identical. The two regions 8, 9 are arranged concentrically relative to each other and are arranged so as to be offset in an axial direction so that the second axial region 9 adjoins the first axial region 8 directly in an axial direction.

The two regions 8, 9 are integrally connected to each other via a large number of connection elements 10. The connection elements 10 are arranged so as to be equidistantly distributed in a peripheral direction. There may, for example, be eight connection elements 10. A radial through-opening 11, through which the tooth elements 6 can be fitted, is formed between the connection elements 10, respectively, in order then to be able to adjoin the inner periphery of the first axial region 8 of the holder 2. The first axial region 8 forms an axial stop, on which an axial front side 12 of the stator portion 3 is axially supported, while the tooth elements 6 are received in the interior of the first axial region 8. The stator portion 3 is then axially fixed with the fixing element 4 from the axial rear side 13 thereof.

Figure 2:
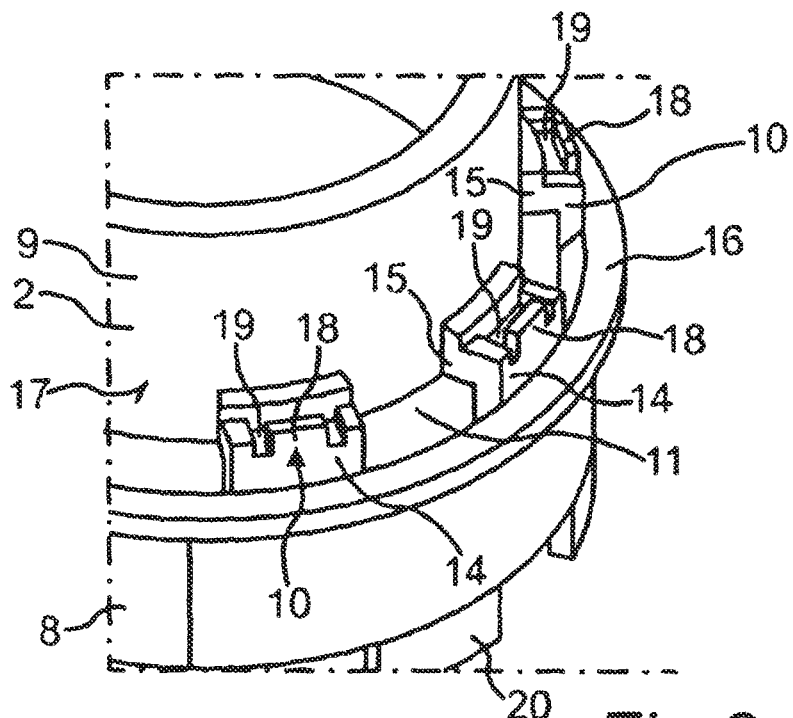
FIG. 2 is a schematic view of an enlarged region of a holder.

FIG. 2 is an enlarged view of a region of the holder 2. In this instance, the construction of the connection elements 10 may be seen more precisely. The connection elements 10 are angular elements and each have an axial region 14 and a radial region 15 which is arranged at right-angles to the axial region 14. The axial region 14 is directly connected to the first axial region 8 of the holder 2, that is to say, to an axial front side 16 of the first region 8. However, the radial region 15 is directly connected to an outer periphery 17 of the second axial region 9 of the holder 2. A welding rib 18, which is constructed in the form of a tooth or an axial extension member or projection, projects from the respective radial region 15 at the outer radial edge of the connection element 15 in an axial direction. The welding ribs 18 are directed in an axial direction towards the second axial region 9. Each connection element 10 has such a welding rib 18. The welding ribs 18 are consequently generally arranged so as to be distributed over the entire periphery. For example, eight welding ribs 18 which are located at the same axial height of the holder 2 are provided.

A partially peripheral collection channel 19 which is formed in a groove-like manner around the welding rib 18 is formed around the welding ribs 18, respectively. The collection channel 19 is in the form of an axial recess in the radial region 15 of the connection element 10. The welding rib 18 consequently rises quasi from the base of that recess.

Figure 3:
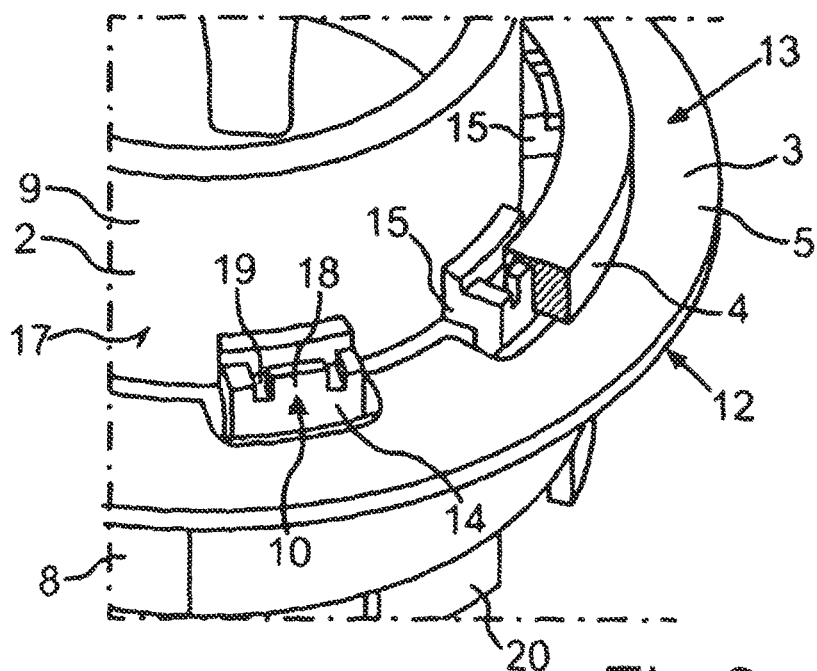
FIG. 3 is a schematic view of the holder with the stator portion fitted thereto and a fixing element which is only partially illustrated in FIG. 3 in order to illustrate the cross-section of the fixing element.

If the stator portion 3 is axially fitted to the second axial region 9, the tooth elements 6 are introduced into the interior of the first axial region 8, as schematically illustrated in FIG. 3. The connection elements 10 are received in the formations 7 in the base element 5. The front side 12 of the base element 5 adjoins the axial front side 16 (FIG. 2) of the first axial region 8. In order to fix the stator portion 3 to the holder 2, the annular fixing element 4 is also fitted to the second axial region 9. The annular fixing element 4 constructed from plastics material then moves into contact with the welding ribs 18 and is joined to those welding ribs 18 by ultrasound welding. Since the fixing element 4 is produced from a thermoplastic plastics material, it is melted during the ultrasound welding so that the welding ribs 18 are introduced into the interior of the fixing element 4 and are connected thereto in a positive-locking, non-positive locking and materially engaging manner. The fixing element 4 can be constructed as an angular element in cross-section.

During the ultrasound welding, the fixing element 4 moves into abutment with the rear side 13 of the base element 5 of the stator portion 3. Only when the fixing element 4 adjoins the rear side 13 over the entire periphery is the welding process interrupted. During the welding, the resultant molten mass of the fixing element 4 is collected in the collection channel 19 so that no additional portions can be formed on the holder 2.

The Figures—as already set out—illustrate only one of the stator portions of the stator which comprises a total of two stator portions. At the other side of the holder 2, a second stator portion is fixed and is constructed in the same manner as or identically to the stator portion 3. Teeth 20, which project in the form of axial extension members from an axial front edge 21 of the first axial region 8 of the holder 2 are then received in the formations 7 of that second stator portion. Those teeth 20 are directed in an axial direction. The fixing action of the second stator portion may appear in such a manner that the tooth elements 6 of that second stator portion are also received in the interior of the first axial region 8 and are moved into abutment with the inner periphery of the first region 8. The tooth elements 6 of the second stator portion are then arranged between the adjacent tooth elements 6 of the stator portion 3 shown. The fixing of the second stator portion may be carried out in the same manner as for the stator portion 3 illustrated. Corresponding welding ribs 18 may also be provided in the teeth 20 and those welding ribs 18 may be joined to the same fixing ring 4 by ultrasound welding.

The invention claimed is:

1. A sensor device for measuring a measurement variable characterizing a rotation state of a shaft portion of a motor vehicle, the sensor device comprising:
   a holder configured to be connected to the shaft portion of the motor vehicle;
   a magnetic stator portion arranged on the holder constructed for conducting magnetic flux from a magnet towards a magnetic sensor and having an annular radial base element, which is axially supported with an axial front side thereof on the holder; and
   a fixing element for fixing the stator portion at least in an axial direction to the holder from an axial rear side thereof which is opposite the axial front side,
   wherein the holder has at least one welding rib, via which the holder is connected to the fixing element by friction welding, and
   wherein the fixing element is constructed to have an annular shape, and is arranged concentrically with respect to the holder.

2. The sensor device according to claim 1, wherein the holder is connected to the fixing element by ultrasound welding via the at least one welding rib.

3. The sensor device according to claim 1, wherein the welding rib forms an axial extension member via which the holder is axially connected to the fixing element.

4. The sensor device according to claim 1, wherein the fixing element adjoins the rear side of the base element of the stator portion.

5. The sensor device according to claim 1, wherein the holder has a large number of welding ribs which are arranged so as to be distributed in a peripheral direction and which are directed in an axial direction and via which the holder is connected to the fixing element by friction welding.

6. The sensor device according to claim 1, wherein the holder has a groove-like collection channel which extends at least partially round the welding rib for a molten mass of the fixing element.

7. The sensor device according to claim 1, wherein the holder has a cylindrical first axial region, on which the base element is axially supported with the front side, and a cylindrical second axial region, which is arranged concentrically relative to the first region, which has a smaller diameter and which is connected to the first axial region in an integral manner, via a large number of connection elements which are arranged so as to be distributed in a peripheral direction.

8. The sensor device according to claim 7, wherein the stator portion is fitted to the second axial region of the holder and the at least one welding rib is constructed on one of the connection elements.

9. The sensor device according to claim 7, wherein the stator portion has a large number of tooth elements, which are arranged so as to be distributed in a peripheral direction and which project in an axial direction from the radial base element, for receiving the magnetic flux from the magnet, and which extend axially into the first axial region of the holder adjoining an inner periphery of the first axial region.

* * * * *